United States Patent
Hayashi

(10) Patent No.: US 10,936,893 B2
(45) Date of Patent: Mar. 2, 2021

(54) INFORMATION PROCESSING DEVICE AND METHOD FOR DOCUMENT IMAGE EXTRACTION, COMPOSITE IMAGE GENERATION, AND OCR PROCESSING INCLUDING DISPLAY OF READING RESOLUTION INSTRUCTIONS BASED ON CHARACTER DENSITY

(71) Applicant: KYOCERA Document Solutions Inc., Osaka (JP)

(72) Inventor: Hironori Hayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/707,356

(22) Filed: Dec. 9, 2019

(65) Prior Publication Data

US 2020/0202156 A1 Jun. 25, 2020

(30) Foreign Application Priority Data

Dec. 19, 2018 (JP) .............................. JP2018-237330

(51) Int. Cl.
*G06K 9/20* (2006.01)
*H04N 1/00* (2006.01)
(Continued)

(52) U.S. Cl.
CPC ....... *G06K 9/2063* (2013.01); *G06K 9/00463* (2013.01); *G06K 9/344* (2013.01);
(Continued)

(58) Field of Classification Search
CPC ........... H04N 1/00331; H04N 1/40062; H04N 1/6072; H04N 1/387; H04N 1/3871; H04N 1/3876; G06K 9/2054–2081; G06K 9/34–348; G06K 9/00442; G06K 9/00456; G06K 9/00026; G06K 9/342; G06K 9/6288; G06K 9/6289; G06K 9/629;
(Continued)

(56) References Cited

U.S. PATENT DOCUMENTS 4,589,144 A * 5/1986 Namba ................ G06K 9/2054
  235/436
4,903,311 A * 2/1990 Nakamura ............... G06K 9/34
  382/174
(Continued)

FOREIGN PATENT DOCUMENTS

JP 2005-167875 A 6/2005

*Primary Examiner* — Scott A Rogers
(74) *Attorney, Agent, or Firm* — Studebaker & Brackett PC

(57) ABSTRACT

An information processing device performs processing on document image data. The document image data includes first image data of a plurality of images and second image data. The first image data undergoes character recognition processing. The second image data does not undergo character recognition processing. The information processing device includes a detecting section, an extracting section, and a processing section. The detecting section detects the first image data from the document image data. The extracting section extracts the first image data from the document image data. The processing section generates composite image data by compositing the images of the first image data and performs character recognition on the composite image data.

8 Claims, 13 Drawing Sheets

(51) Int. Cl.
*G06K 9/34* (2006.01)
*G06T 7/11* (2017.01)
*G06K 9/80* (2006.01)
*G06K 9/60* (2006.01)
*G06K 9/00* (2006.01)
*H04N 1/40* (2006.01)
*H04N 1/60* (2006.01)

(52) U.S. Cl.
CPC ............... *G06K 9/60* (2013.01); *G06K 9/80* (2013.01); *G06T 7/11* (2017.01); *H04N 1/00822* (2013.01); *H04N 1/00824* (2013.01); *H04N 1/40062* (2013.01); *H04N 1/6072* (2013.01); *G06K 2209/01* (2013.01); *G06K 2209/011* (2013.01); *G06T 2207/30242* (2013.01); *H04N 1/00411* (2013.01)

(58) Field of Classification Search
CPC .. G06K 9/60; G06K 9/74; G06K 9/78; G06K 9/80; G06K 9/82; G06K 2209/01; G06K 15/1822; G06K 15/1852; G06K 15/1889; G06T 7/10; G06T 7/11; G06T 7/12; G06T 7/174; G06T 7/90; G06T 11/60
See application file for complete search history.

(56) References Cited

U.S. PATENT DOCUMENTS

| | | | | |
|---|---|---|---|---|
| 5,249,240 | A * | 9/1993 | Nakayama | G06Q 40/02 382/159 |
| 5,272,764 | A * | 12/1993 | Bloomberg | G06K 9/20 358/453 |
| 7,321,688 | B2 * | 1/2008 | Fujiwara | G06K 9/38 382/176 |
| 8,718,365 | B1 * | 5/2014 | Bissacco | G06K 9/34 382/175 |
| 2007/0253620 | A1 * | 11/2007 | Nagarajan | G06K 9/2054 382/164 |
| 2008/0144131 | A1 * | 6/2008 | Jung | H04N 1/00968 358/474 |
| 2009/0148043 | A1 * | 6/2009 | Ophir | G06K 9/00456 382/176 |
| 2020/0202123 | A1 * | 6/2020 | Hayashi | G06K 9/03 |

* cited by examiner

INFORMATION PROCESSING DEVICE AND METHOD FOR DOCUMENT IMAGE EXTRACTION, COMPOSITE IMAGE GENERATION, AND OCR PROCESSING INCLUDING DISPLAY OF READING RESOLUTION INSTRUCTIONS BASED ON CHARACTER DENSITY

INCORPORATION BY REFERENCE

The present application claims priority under 35 U.S.C. § 119 to Japanese Patent Application No. 2018-237330, filed on Dec. 19, 2018. The contents of this application are incorporated herein by reference in their entirety.

BACKGROUND

The present disclosure relates to an information processing device and an information processing method.

An image forming apparatus has been developed which selects and extracts a designated area from image data generated by reading a document. For example, the image forming apparatus determines whether or not there is an area encircled by a marker pen in the image data.

When determining that there is an area encircled by a marker pen in the image data, the image forming apparatus prints the inside or the outside of the area surrounded by marker pen on a sheet. When determining that there is no area encircled by a marker pen in the image data, the image forming apparatus prints the image data unchanged on a sheet.

SUMMARY

An information processing device according to an aspect of the present disclosure performs processing on document image data. The document image data includes first image data of a plurality of images and second image data. The first image data undergoes character recognition processing. The second image data does not undergo character recognition processing. The information processing device includes a detecting section, an extracting section, and a processing section. The detecting section detects the first image data from the document image data. The extracting section extracts the first image data from the document image data. The processing section generates composite image data by compositing the images of the first image data and performs character recognition on the composite image data.

An information processing method according to an aspect of the present disclosure is a method for performing processing on document image data. The document image data includes first image data of a plurality of images and second image data. The first image data undergoes character recognition processing. The second image data does not undergo character recognition processing. The information processing method includes: detecting the first image data from the document image data; extracting the first image data from the document image data; generating composite image data by compositing the images of the first image data; and performing character recognition processing on the composite image data.

DETAILED DESCRIPTION

Figure 1:
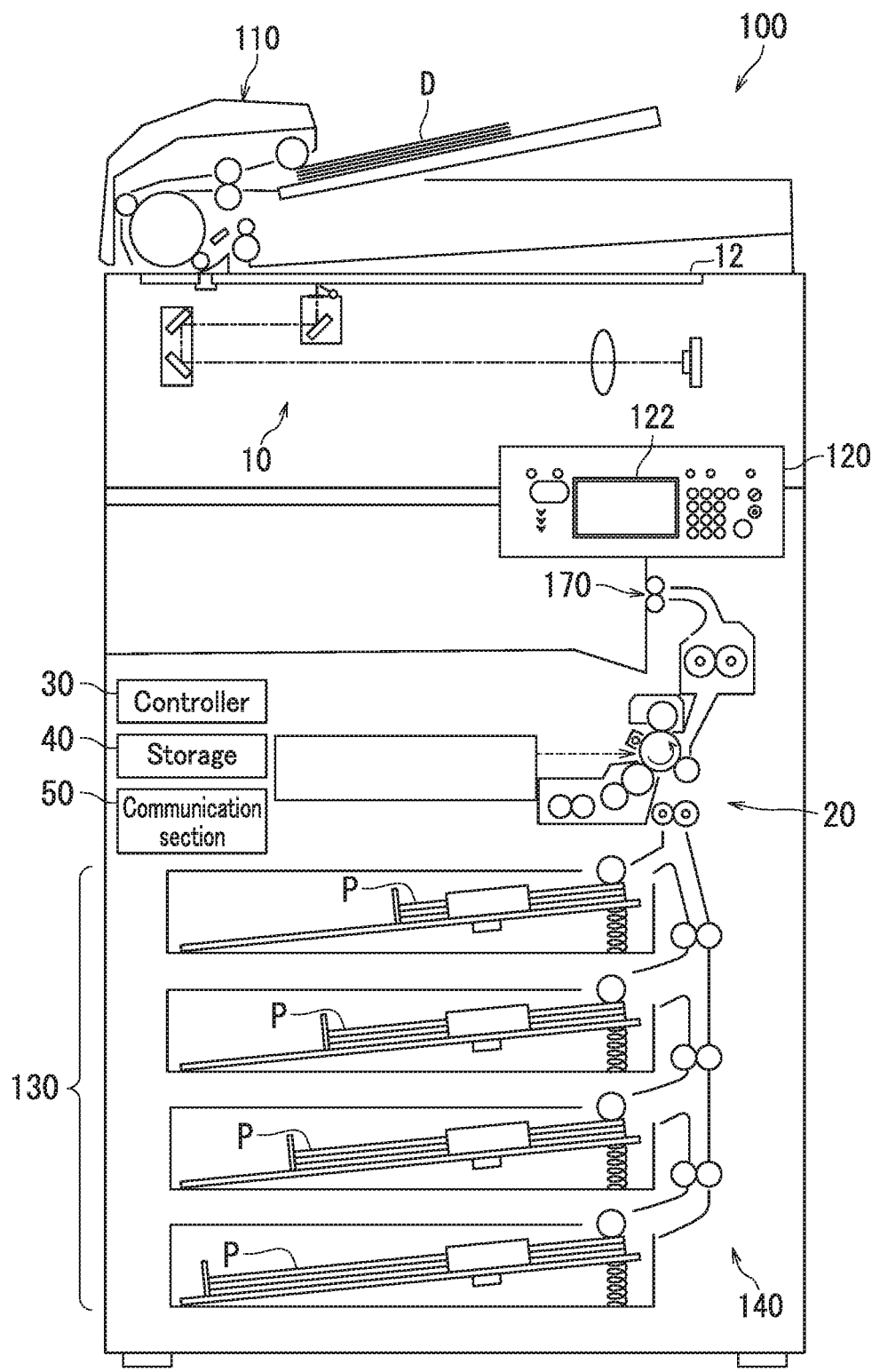
FIG. 1 is a diagram illustrating a configuration of an information processing device according to a first embodiment of the present disclosure.

The following describes embodiments of the present disclosure with reference to the accompanying drawings. Elements that are the same or equivalent are labeled with the same reference signs in the drawings and description thereof is not repeated.

First Embodiment

An information processing device 100 according to a first embodiment is described with reference to FIG. 1. FIG. 1 is a diagram illustrating a configuration of the information processing device 100 according to the first embodiment. Examples of the information processing device 100 include a copier, a printer, and a multifunction peripheral. In the following, an example of the information processing device 100 is described as being a monochrome multifunction peripheral with a printer function, a copy function, and a facsimile function.

As illustrated in FIG. 1, the information processing device 100 includes an image reading section 10, an image forming section 20, a controller 30, storage 40, a communication section 50, a document table 12, a document conveyor device 110, an operation panel 120, a paper feed cassette 130, a paper conveyance section 140, and a paper ejecting section 170.

The image reading section 10 reads an image from a document D at a preset resolution. The image reading section 10 generates data indicating the image of the document D. In detail, the image reading section 10 reads an image from a document D conveyed by the document conveyor device 110. The image reading section 10 then generates data indicating the image of the document D. Alternatively, the image reading section 10 reads an image from a document D loaded on the document table 12. The image reading section 10 then generates data indicating the image of the document D. In the following, the image of the document D may be referred to as a "document image". The data indicating the image of the document D may be referred to as "document image data".

The image forming section 20 forms an image on paper P based on the document image data. The paper P is an example of a recording medium.

The controller 30 is a hardware circuit including elements such as an application-specific integrated circuit (ASIC) and a processor like a central processing unit (CPU). The controller 30 reads out and executes a control program stored in the storage 40 with the processor to control operation of each element of the information processing device 100. The controller 30 performs processing on the document image data.

The document image data includes first image data and second image data. A first image is an image generated based on the first image data and which undergoes character recognition processing. The first image data may be image data of a plurality of images. A second image is an image generated based on the second image data and which does not undergo character recognition processing. The second image data may be image data of one image. The first image is an image in which characters are marked, for example. For example, a user marks the characters using a writing tool such as a pink highlighter pen. The user may also use software to mark the characters in image data.

The controller 30 generates data indicating a composite image including only the first image data from the document image data. The controller 30 performs character recognition processing on the data indicating the composite image. Therefore, the time required for character recognition processing is shortened. As a result, convenience for the user is improved. In the following, data indicating the composite image may be referred to as "composite image data".

The storage 40 is constituted by a hard disk drive (HDD), random-access memory (RAM), and read-only memory (ROM). The storage 40 may also include external memory. The external memory is removable media. The storage 40 includes for example Universal Serial Bus (USB) memory and a Secure Digital (SD) card as the removable memory. The storage 40 stores therein various data and the control program for controlling the operation of each element of the information processing device 100. The control program is executed by the controller 30.

The communication section 50 is capable of communication with an electronic device equipped with a communication module using the same communication method (protocol) as the communication section 50. According to the present embodiment, the communication section 50 communicates with an external device through a network such as a local area network (LAN). The communication section 50 is a communication module (communication device) such as a LAN board. The document image data may be image data sent from the external device through the communication section 50.

The operation panel 120 is used by the user to operate the information processing device 100. The operation panel 120 has a display section 122. The display section 122 is a touch panel, for example. The display section 122 displays an input screen for the user to operate the information processing device 100. The display section 122 also displays an instruction screen. The instruction screen is described later with reference to FIG. 13.

The paper feed cassette 130 houses the paper P for printing. In printing, the paper P housed in the paper feed cassette 130 is conveyed by the paper conveyance section 140. The paper P is ejected from the paper ejecting section 170 by way of the image forming section 20.

Figure 2:
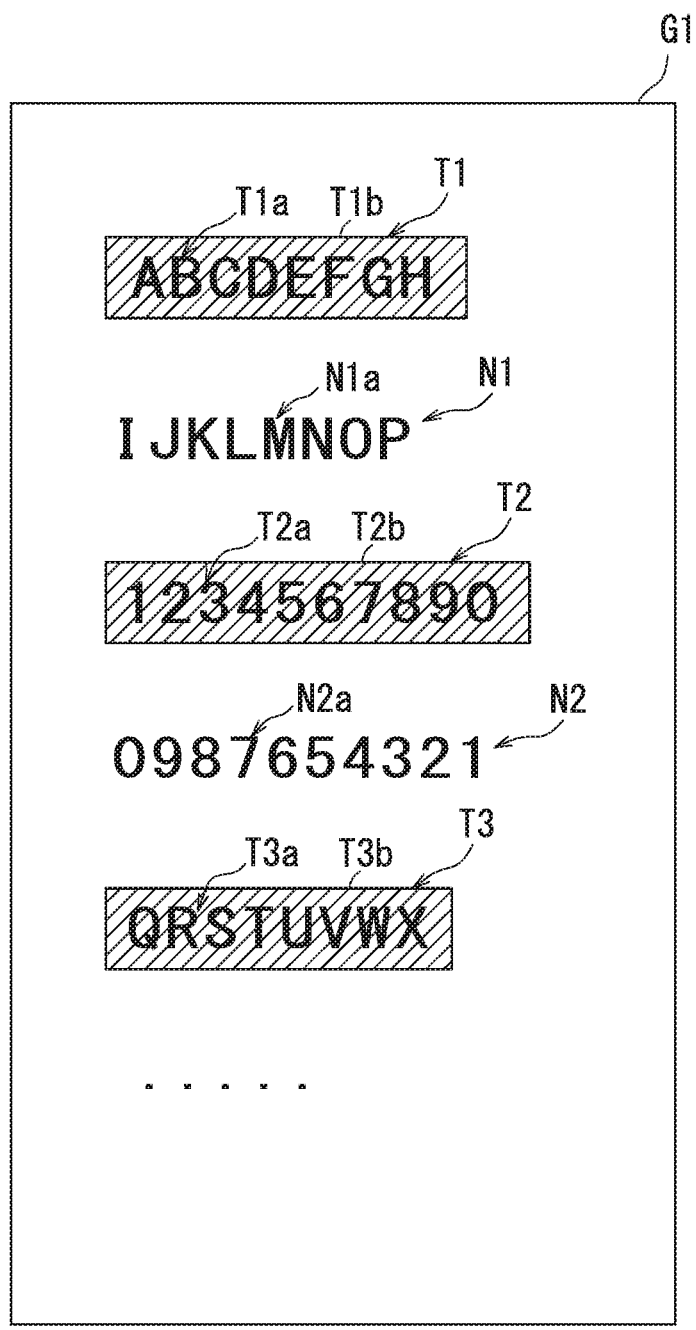
FIG. 2 is a diagram illustrating a document image according to the first embodiment of the present disclosure.

FIG. 2 is a diagram illustrating a document image G1 according to the first embodiment. As illustrated in FIG. 2, the document image G1 includes first images T1, T2, and T3, and second images N1 and N2.

The first image T1 includes a character string image T1$a$ and an identification image T1$b$. The first image T2 includes a character string image T2$a$ and an identification image T2$b$. The first image T3 includes a character string image T3$a$ and an identification image T3$b$.

The character string images T1$a$, T2$a$, and T3$a$ each include a plurality of character images. A character image exhibits one character. In other words, the character string images T1$a$, T2$a$, and T3$a$ each are an image exhibiting a character string. In FIG. 2, the character string image T1$a$ exhibits a character string "ABCDEFGH". The character string image T2$a$ exhibits a character string "1234567890". The character string image T3$a$ exhibits a character string "QRSTUVWX".

The identification images T1$b$, T2$b$, and T3$b$ respectively indicate that the character string images T1$a$, T2$a$, and T3$a$ are to undergo character recognition processing. The identification image T1$b$ is a marking image superimposed on the character string image T1$a$. The identification image T2$b$ is a marking image superimposed on the character string image T2$a$. The identification image T3$b$ is a marking image superimposed on the character string image T3$a$. In the example illustrated in FIG. 2, the identification images T1$b$, T2$b$, and T3$b$ are images of straight lines or substantially straight lines drawn with a pink highlighter pen.

The second image N1 includes a character string image N1$a$. The second image N2 includes a character string image N2$a$.

In FIG. 2, the character string images N1$a$ and N2$a$ are images exhibiting character strings. In FIG. 2, the character string image N1$a$ exhibits a character string "IJKLMNOP". The character string image N2$a$ exhibits a character string "0987654321".

Figure 3:
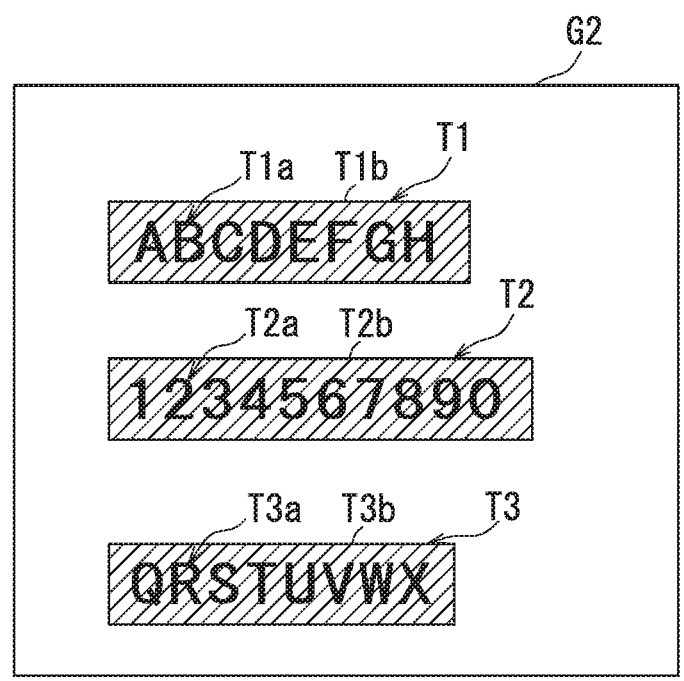
FIG. 3 is a diagram illustrating a composite image according to the first embodiment of the present disclosure.

FIG. 3 is a diagram illustrating a composite image G2 according to the first embodiment. As illustrated in FIG. 3, the composite image G2 includes first images T1, T2, and T3. The composite image G2 is an image in which a plurality of first images, specifically the first images T1, T2, and T3, have been composited. The first images T1, T2, and T3 of the composite image G2 are respectively the same as the first images T1, T2, and T3 of the document image G1 described with reference to FIG. 2.

Figure 4:
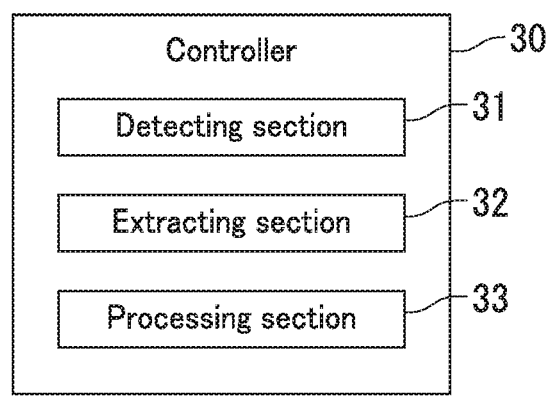
FIG. 4 is a block diagram illustrating a configuration of a controller of the information processing device according to the first embodiment of the present disclosure.

Next, a configuration of the controller 30 according to the first embodiment is described with reference to FIG. 4. FIG. 4 is a block diagram illustrating the configuration of the controller 30 according to the first embodiment.

As illustrated in FIG. 4, the controller 30 includes a detecting section 31, an extracting section 32, and a processing section 33. Specifically, the controller 30 functions as a detecting section 31, an extracting section 32, and a processing section 33 by executing the control program stored in the storage 40.

The detecting section 31 detects the first images T1, T2, and T3 from the data indicating the document image G1 described with reference to FIG. 2. Specifically, the detecting section 31 detects respective images including the identification images T1b, T2b, and T3b as first images.

The extracting section 32 extracts data indicating the first images T1, T2, and T3 detected by the detecting section 31 from the data indicating the document image G1.

The processing section 33 composites the data indicating the first images T1, T2, and T3 extracted by the extracting section 32. The processing section 33 generates data indicating the composite image G2 described with reference to FIG. 3. The processing section 33 performs character recognition processing on the data indicating the composite image G2. Character recognition processing is processing through which the character images (hiragana, katakana. Roman alphabet, kanji, Arabic numerals, or symbols, for example) included in the document image are optically recognized and converted into a character code.

As a result of performing character recognition processing, the processing section 33 acquires data indicating the character string "ABCDEFGH" included in the character string image T1a from the data indicating the first image T1. The processing section 33 also acquires data indicating the character string "1234567890" included in the character string image T2a from the data indicating the first image T2. The processing section 33 also acquires data indicating the character string "QRSTUVWX" included in the character string image T3a from the data indicating the first image T3.

The processing section 33 outputs character string data acquired through performing character recognition processing. The character string data is data indicating the respective character strings. For example, the processing section 33 records the character string data in an electronic file. Alternatively, the processing section 33 sends the character string data to an external information terminal. Alternatively, the processing section 33 operates the information processing device 100 to print the character strings on the paper P described with reference to FIG. 1. The processing section 33 displays the character strings on the display section 122 described with reference to FIG. 1.

Figure 5:
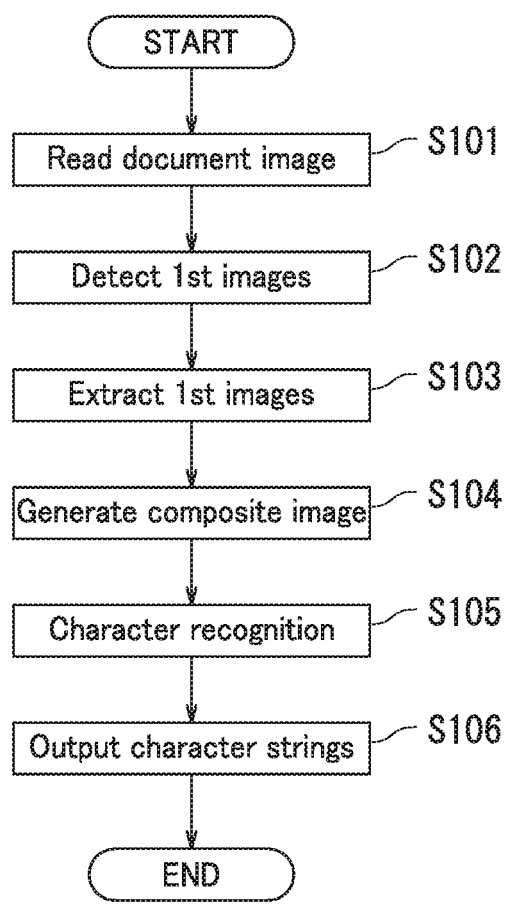
FIG. 5 is a flowchart depicting an operation through which the information processing device according to the first embodiment of the present disclosure reads a document image and outputs character string data.

Next, the operation of the information processing device 100 according to the first embodiment is described with reference to FIG. 5. FIG. 5 is a flowchart depicting an operation through which the information processing device 100 reads the image of the document D and outputs character string data.

The operation depicted in FIG. 5 starts when the user, for example, places the document D on the document conveyor device 110 described with reference to FIG. 1 and instructs the information processing device 100 to read the image of the document D.

In Step S101, the image reading section 10 reads the image of the document D and generates data indicating the document image G1. The operation advances to Step S102.

In Step S102, the detecting section 31 detects the first images T1, T2, and T3 included in the document image G1. The operation advances to Step S103.

In Step S103, the extracting section 32 extracts the data indicating the detected first images T1, T2, and T3 from the document image data. The operation advances to Step S104.

In Step S104, the processing section 33 composites the data indicating the extracted first images T1, T2, and T3, and generates data indicating the composite image G2. The operation advances to Step S105.

In Step S105, the processing section 33 performs character recognition processing on the data indicating the composite image G2. The operation advances to Step S106.

In Step S106, the processing section 33 outputs the character string data acquired through character recognition processing. The operation depicted in FIG. 5 ends.

The information processing device 100 according to the first embodiment of the present disclosure is described above with reference to FIGS. 1 to 5. According to the first embodiment, the information processing device 100 generates the composite image G2 including only the first images T1, T2, and T3 from the document image G1. The information processing device 100 then performs character recognition processing on the composite image G2. Accordingly, the time required for character recognition processing is shortened. As a result, the convenience for the user is improved.

In the information processing device 100 described with reference to FIGS. 1 to 5, the identification images T1b, T2b, and T3b included in the document image G11 are marking images drawn with a pink highlighter pen. However, the identification images T1b. T2b, and T3 may be marking images drawn not with a pink highlighter pen, but with a yellow highlighter pen, for example. Furthermore, the identification images T1b, T2b, and T3a may be superimposed not on respective entireties of the character string images T1a, T2a, and T3a but only on respective lower halves of the character string images T1a, T2a, and T3a, for example.

Second Embodiment

The following describes a second embodiment of the present disclosure with reference to FIGS. 2 and 6 to 9. According to the second embodiment, the information processing device 100 changes the method of character recognition processing according to the number of first images T1, T2, and T3 included in the document image G1 described with reference to FIG. 2. As a result, the convenience for the user is improved.

Figure 6:
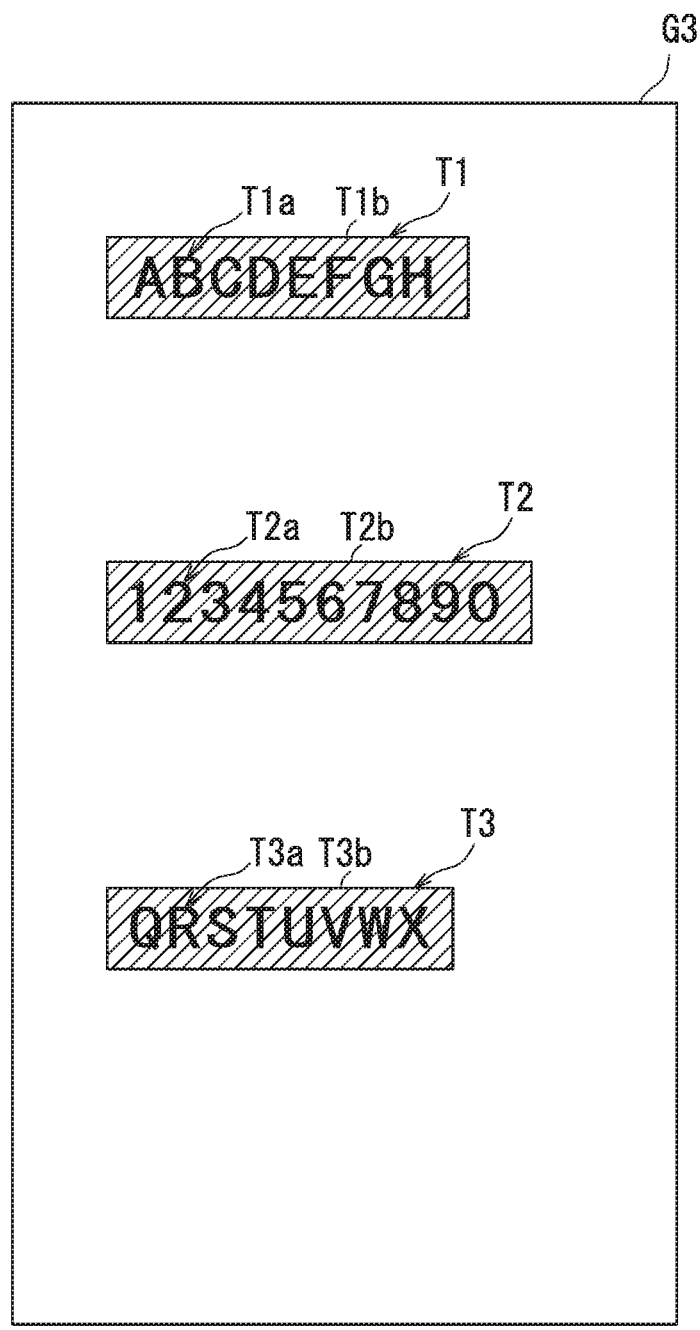
FIG. 6 is a diagram illustrating a masking image according to a second embodiment of the present disclosure.

FIG. 6 is a diagram illustrating a masking image G3 according to the second embodiment. According to the present embodiment, the masking image G3 is formed by masking the second images N1 and N2 of the document image G1 described with reference to FIG. 2 with the background color of the document image G1.

The background color is the color of a part of the document image G1 described with reference to FIG. 2 in which first and second images are not drawn. The background color is preset by the user. The background color is white, for example. First images T1, T2, and T3 of the masking image G3 are the same as the first images T1, T2, and T3 of the document image G1.

Figure 7A:
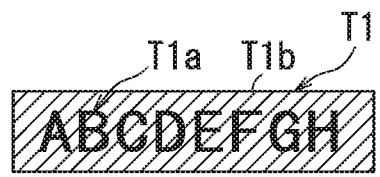
FIGS. 7A to 7C are diagrams each illustrating a first image extracted from the document image according to the second embodiment of the present disclosure.
Figure 7B:
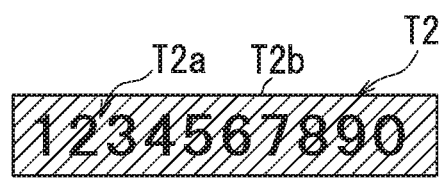
Figure 7C:
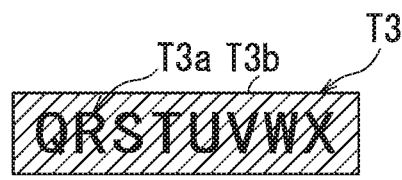

FIGS. 7A to 7C are diagrams illustrating the first images T1, T2, and T3 extracted from the document image G1. FIG. 7A is a diagram illustrating the first image T1 extracted from the document image G1. FIG. 7B is a diagram illustrating the first image 12 extracted from the document image G1. FIG. 7C is a diagram illustrating the first image T3 extracted from the document image G1.

Figure 8:
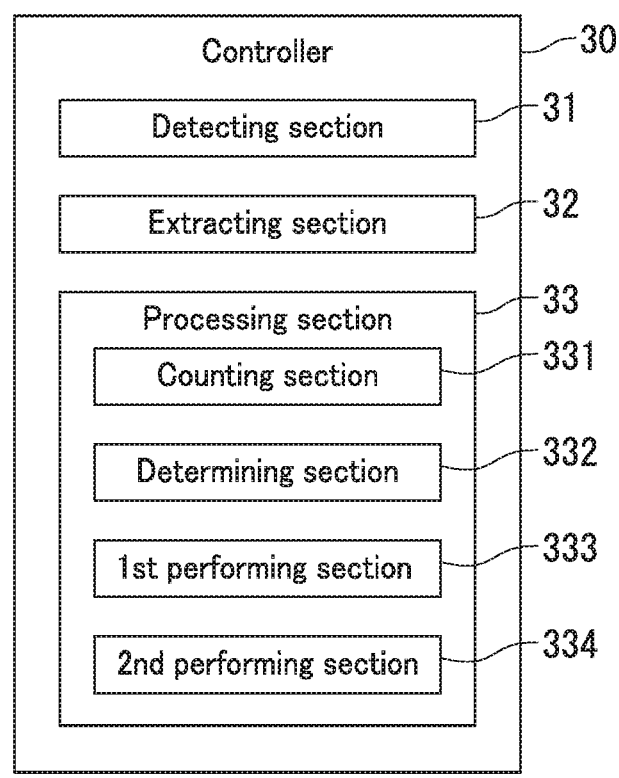
FIG. 8 is a block diagram illustrating a configuration of the controller of the information processing device according to the second embodiment of the present disclosure.

Next, the configuration of the controller 30 according to the second embodiment is described with reference to FIG. 8. FIG. 8 is a block diagram illustrating the configuration of the controller 30 according to the second embodiment. As illustrated in FIG. 8, the controller 30 of the second embodiment has the same configuration as the controller 30 of the first embodiment except for the configuration of the processing section 33. Accordingly, description of the configuration of the controller 30 according to the second embodiment other than the configuration of the processing section 33 is omitted.

The processing section 33 includes a counting section 331, a determining section 332, a first performing section 333, and a second performing section 334. Specifically, the controller 30 functions as a counting section 331, a determining section 332, a first performing section 333, and a second performing section 334 by executing the control program stored in the storage 40.

The processing section 33 outputs character string data acquired by performing character recognition processing in the same manner as the processing section 33 described in the first embodiment.

The counting section 331 counts the number of the first images T1, T2, and T3 extracted by the extracting section 32. As illustrated in FIGS. 7A to 7C, the number of first images T1, T2, and T3 is three in the second embodiment.

The determining section 332 determines whether or not the number of the first images T1, T2, and T3 is greater than a threshold. The threshold is "five", for example. The threshold can be set and changed by the user or a maintenance manager. The threshold can also be set in manufacturing of the information processing device 100 at a factory.

When the number of the first images T1, T2, and T3 is determined to be greater than the threshold, the first performing section 333 performs first processing. The first processing is character recognition processing on data indicating the masking image G3 described with reference to FIG. 6. Specifically, the first performing section 333 performs processing on the data indicating the document image G1 to mask the second images N1 and N2 with the background color of the document image G1. As a result, data indicating the masking image G3 is generated.

When the number of the first images T1, T2, and T3 is determined not to be greater than the threshold, the second performing section 334 performs second processing which differs from the first processing. The second processing is character recognition processing on the first images T1, T2, and T3 described with reference to FIGS. 7A to 7C.

Figure 9:
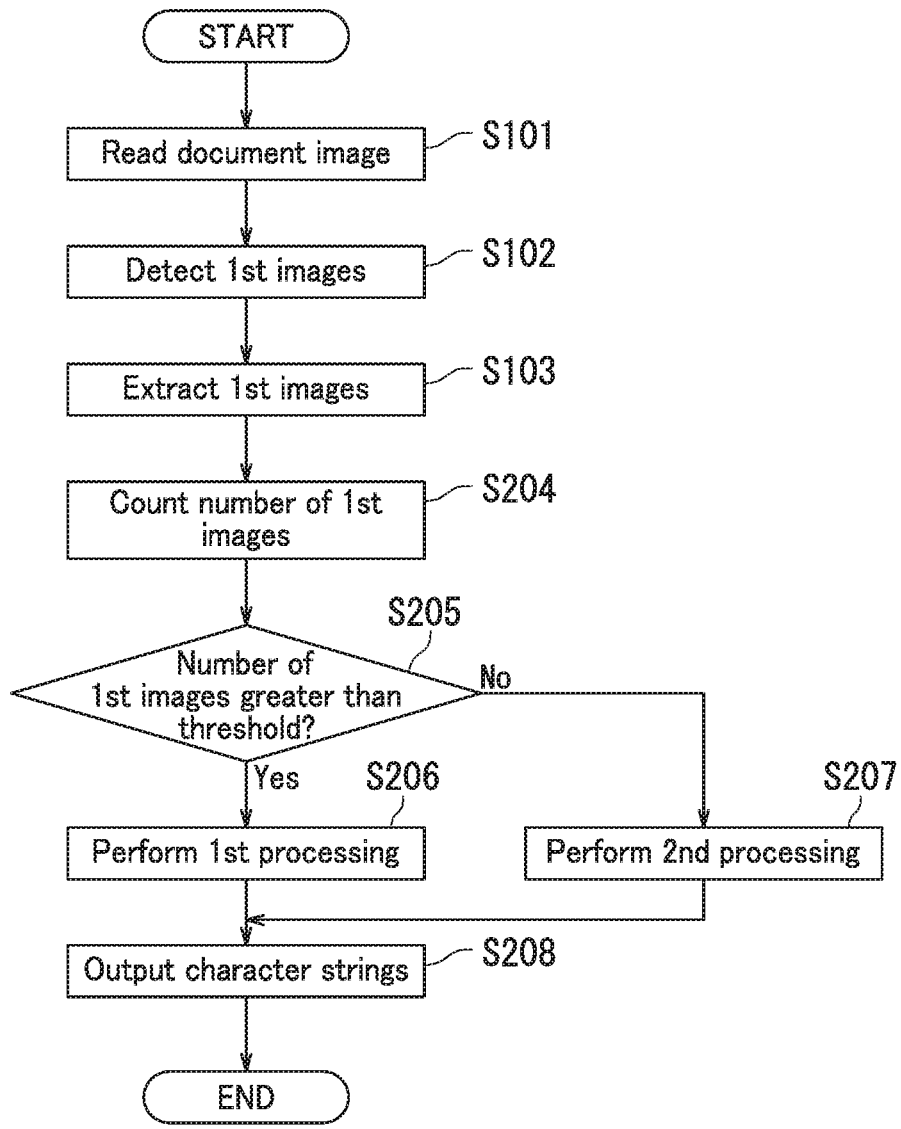
FIG. 9 is a flowchart depicting an operation through which the information processing device according to the second embodiment of the present disclosure reads a document image and outputs character string data.

Next, the operation of the information processing device 100 according to the second embodiment is described with reference to FIG. 9. FIG. 9 is a flowchart depicting an operation through which the information processing device 100 reads the image of the document D and outputs character string data. Steps S101 to S103 are respectively the same as Steps S101 to S103 of the first embodiment. Accordingly, description of Steps S101 to S103 is omitted.

In Step S204, the counting section 331 counts the number of the extracted first images T1, T2, and T3. The operation advances to Step S205.

In Step S205, the determining section 332 determines whether or not the number of the first images T1, T2, and T3 is greater than the threshold. When the determining section 332 determines that the number is greater than the threshold (Yes in Step S205), the operation advances to Step S206. When the determining section 332 determines that the number is not greater than the threshold (No in Step S205), the operation advances to Step S207.

In Step S206, the first performing section 333 performs the first processing. The operation advances to Step S208.

In Step S207, the second performing section 334 performs the second processing. The operation advances to Step S208.

In Step S208, the processing section 33 outputs the character string data acquired through character recognition processing. The operation depicted in FIG. 9 ends.

The information processing device 100 according to the second embodiment of the present disclosure is described above with reference to FIGS. 2 and 6 to 9. According to the second embodiment, the information processing device 100 changes the method of character recognition processing according to the number of first images included in the document image. As a result, the user can select the most appropriate method of character recognition according to the document image. Therefore, the convenience for the user is improved.

Third Embodiment

Figure 10:
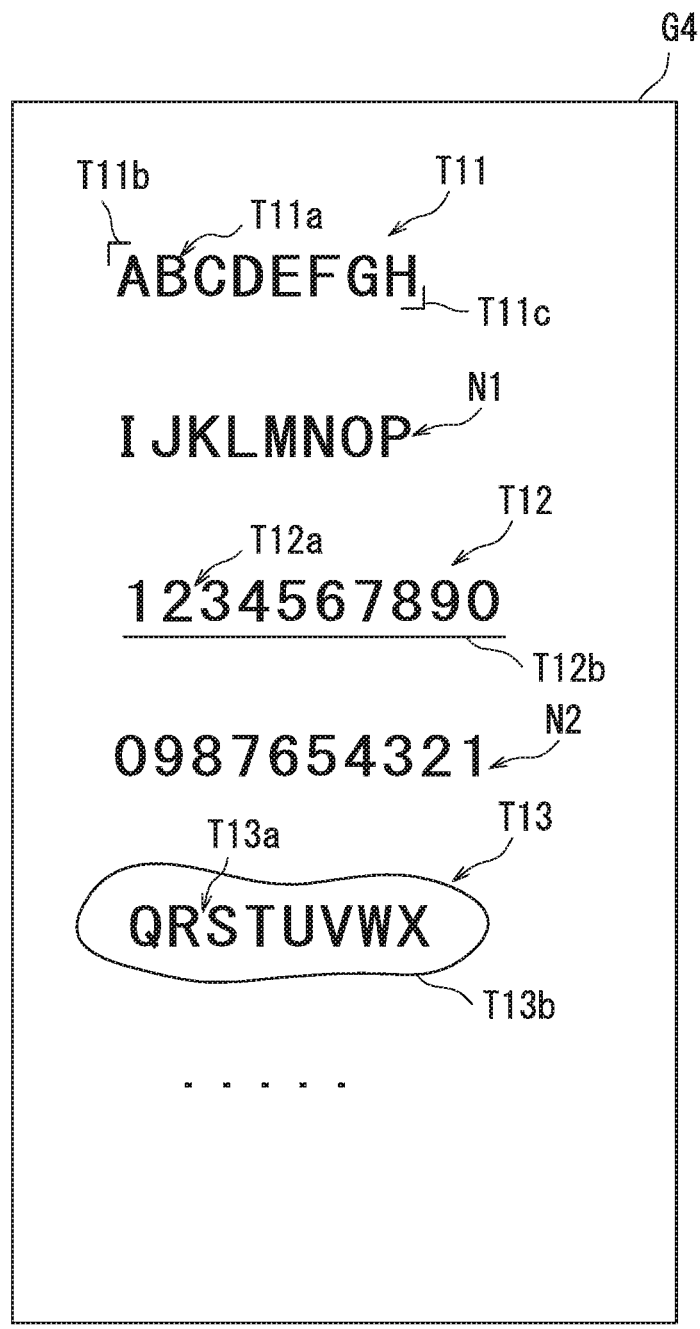
FIG. 10 is a diagram illustrating a document image according to a third embodiment of the present disclosure.

The following describes a third embodiment of the present disclosure with reference to FIGS. 1, 4, and 10. According to the third embodiment, the information processing device 100 can perform character recognition processing using an identification image which is not a marking image. As a result, the convenience for the user is improved.

The information processing device 100 according to the third embodiment can perform character recognition processing when an identification image is a symbol or a line drawing that specifies an area in which character images are positioned. Examples of a symbol specifying an area in which character images are positioned include square brackets, round brackets, and lenticular brackets. Examples of a line drawing specifying an area in which character images are positioned include an underline, a rectangular line drawing, a round line drawing, a triangular line drawing, and a cloud-shaped line drawing.

FIG. 10 is a diagram illustrating a document image G4 according to the third embodiment. Except for first images T11, T12, and T13, the document image G4 in FIG. 10 is the same as the document image G1. Accordingly, description of the document image G4 other than the first images T1, T12, and T13 is omitted.

The first image T11 includes a character string image T11a and identification images T11b and T11c. The first image T12 includes a character string image T12a and an identification image T12b. The first image T13 includes a character string image T13a and an identification image T13b.

The character string image T11a is the same as the character string image T1a described in the first and second embodiments. The character string image T12a is the same as the character string image T2a described in the first and second embodiments. The character string image T13a is the same is the character string image T3a described in the first and second embodiments. Accordingly, description of the character string images T11a, T12b, and T13c is omitted.

The identification images T11b and T11c are images exhibiting square brackets. The identification image T12b is an image exhibiting an underline. The identification image T13b is an image exhibiting a cloud-shaped line drawing. As illustrated in FIG. 10, the identification images T11b, T11c, T12b, and T13b are specifying the areas in which the character string images T11a, T12a, and T13a are positioned.

The configuration of the information processing device 100 of the third embodiment is the same as the configuration of the information processing device 100 of the first embodiment except for that the detecting section 31 detects the identification images T11b, T11c, T12b, and T13b as identification images. Accordingly, description of the configuration of the information processing device 100 of the third embodiment is omitted.

The operation of the information processing device 100 of the third embodiment is the same operation as the information processing device 100 of the first embodiment except for that the detecting section 31 detects the identification images T11b, T11c, T12b, and T13b as identification images. Accordingly, description of the operation of the information processing device 100 of the third embodiment is omitted.

The information processing device 100 according to the third embodiment of the present disclosure is described above with reference to FIGS. 1, 4, and 10. According to the third embodiment, the information processing device 100 can perform character recognition processing using an identification image which is not a marking image included in a first image. As a result, the convenience for the user is improved.

The processing section 33 according to the third embodiment may include the counting section 331, the determining section 332, the first performing section 333, and the second performing section 334 likewise to the processing section 33 according to the second embodiment.

Fourth Embodiment

The following describes a fourth embodiment of the present disclosure with reference to FIGS. 1, 4, 11A, and 11B. The processing section 33 of the fourth embodiment translates and outputs a character string acquired through character recognition processing. As a result, the convenience for the user is improved. Translation is an example of prescribed processing.

Figure 11A:
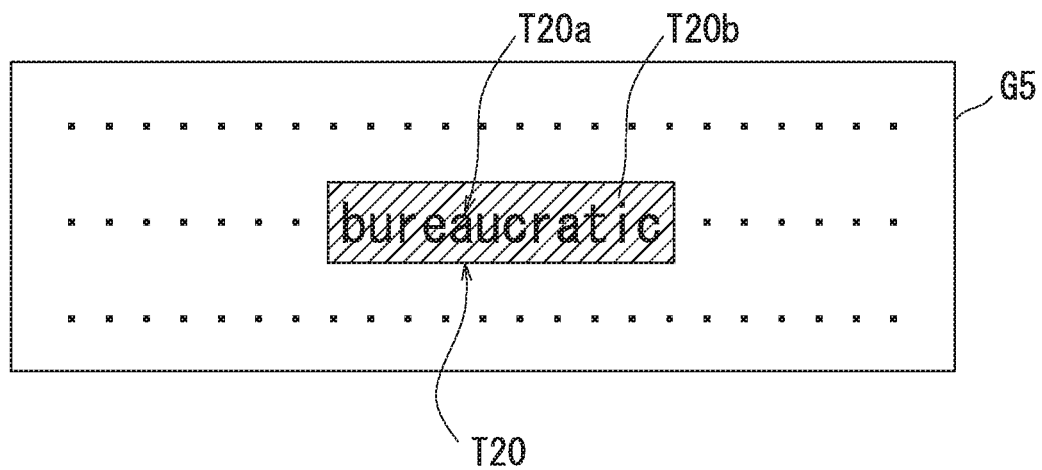
FIG. 11A is a diagram illustrating a pre-translation document image according to a fourth embodiment of the present disclosure.
Figure 11B:
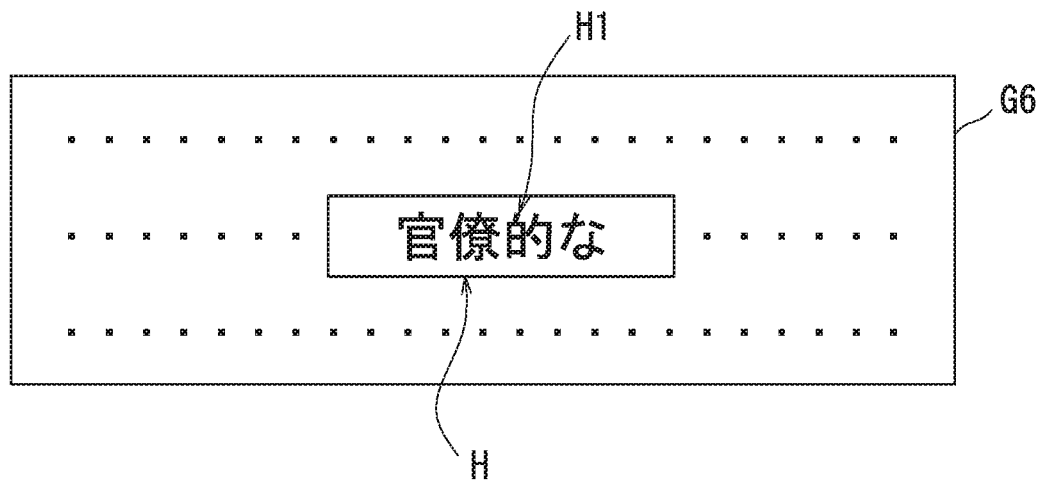
FIG. 11B is a diagram illustrating a post-translation image according to the fourth embodiment of the present disclosure.

FIG. 11A is a diagram illustrating a pre-translation document image G5. FIG. 11B is a diagram illustrating a post-translation image G6. The information processing device 100 of the fourth embodiment translates a character string acquired through character recognition processing.

As illustrated in FIG. 11A, the pre-translation document image G5 includes a first image T20 which is to undergo translation. The first image T20 includes a character string image T20a and an identification image T20b. The character string image T20a is an image exhibiting a character string. In FIG. 11A, the character string image T20a exhibits the character string "bureaucratic". The identification image T20b is a straight line-shaped image drawn with the same pink highlighter pen as the identification image T1b described in FIG. 2.

As illustrated in FIG. 11B, the post-translation image G6 includes a translation image H translated by the processing section 33. The translation image H includes a character string image HI. The character string image HI exhibits a translated character string. In FIG. 1B, the character string image HI exhibits the character string "官僚的な".

The configuration of the information processing device 100 of the fourth embodiment is the same as the configuration of the information processing device 100 of the first embodiment except for that the processing section 33 translates a character string acquired by performing character recognition processing. Accordingly, description of the configuration of the information processing device 100 of the fourth embodiment is omitted.

The operation of the information processing device 100 of the fourth embodiment is the same operation as the information processing device 100 of the first embodiment except for that the processing section 33 translates a character string acquired by performing character recognition processing. Accordingly, description of the operation of the information processing device 100 of the fourth embodiment is omitted.

The information processing device 100 according to the fourth embodiment of the present disclosure is described above with reference to FIGS. 1, 4, 11A, and 11B. According to the fourth embodiment, the information processing device 100 can acquire a character string by performing character recognition processing. The information processing device 100 can also translate the acquired character string. As a result, the convenience for the user is improved.

According to the fourth embodiment, the information processing device 100 translates English to Japanese. However, the source and target languages of translation are not particularly limited. For example, the information processing device 100 may translate Japanese to English.

The processing section 33 according to the fourth embodiment may include the counting section 331, the determining section 332, the first performing section 333, and the second performing section 334 likewise to the processing section 33 according to the second embodiment.

Fifth Embodiment

The following describes a fifth embodiment of the present disclosure with reference to FIGS. 1, 4, 12A, and 12B. The processing section 33 of the fifth embodiment changes the style of a character string acquired through character recognition processing and outputs the character string of which style has been changed. The processing section 33 changes at least one of the color, size (font size), and shape (font type) of a character string and outputs the character string, for example. The processing section 33 may also add a new underline to character images, for example. The processing section 33 may also superimpose a new marking image on character images. Changing style is an example of prescribed processing.

Specifically, the processing section 33 changes the size of a character string included in the first image from 12 points to 24 points, for example. The processing section 33 further controls the operation of the information processing device 100 such that the changed character string is printed on the paper P. As a result of the information processing device 100 changing the style of the first image and outputting the first image, the first image is emphasized on the paper P. As a result, the convenience for the user is improved.

Figure 12A:
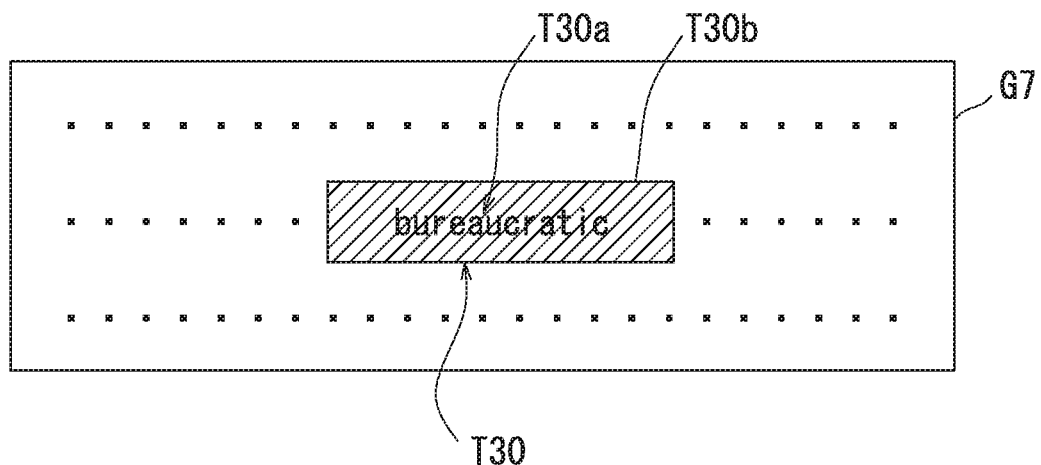
FIG. 12A is a diagram illustrating a pre-style change document image according to a fifth embodiment of the present disclosure.
Figure 12B:
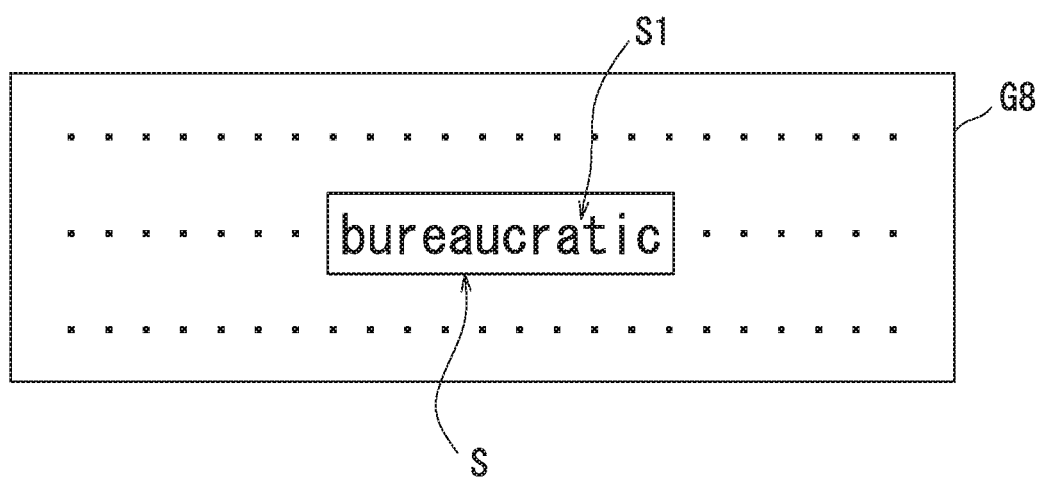
FIG. 12B is a diagram illustrating a post-style change image according to the fifth embodiment of the present disclosure.

FIG. 12A is a diagram illustrating a pre-style change document image G7. FIG. 12B is a diagram illustrating a post-style change image G8. The information processing device 100 of the fifth embodiment changes the style of a character string acquired through character recognition processing.

As illustrated in FIG. 12A, the pre-style change document image G7 includes a first image T30 which is to undergo style change. The first image T30 includes a character string image T30a and an identification image T30b. The character string image T30a is an image exhibiting a character string. In FIG. 12A, the character string image T30a exhibits the character string "bureaucratic". The identification image T30b is an image exhibiting a straight line. The image of the straight line is drawn with the same pink highlighter pen as the identification image T1b described with reference to FIG. 2.

As illustrated in FIG. 12B, the post-style change image G8 includes a changed image S. The changed image S includes a character string image S1. The character string image S1 is an image exhibiting a character string. The character string image S1 exhibits the character string "bureaucratic". The font size of the character string included in the character string image S1 is larger than the font size of the character string included in the character string image T30a.

The configuration of the information processing device 100 of the fifth embodiment is the same as the configuration of the information processing device 100 of the first embodiment except for that the processing section 33 changes the style of a character string acquired by performing character recognition processing. Accordingly, description of the configuration of the information processing device 100 of the fifth embodiment is omitted.

The operation of the information processing device 100 of the fifth embodiment is the same operation as the information processing device 100 of the first embodiment except for that the processing section 33 changes the style of a character string acquired by performing character recognition processing. Accordingly, description of the operation of the information processing device 100 of the fifth embodiment is omitted.

The information processing device 100 according to the fifth embodiment of the present disclosure is described above with reference to FIGS. 1, 4, 12A, and 12B. According to the fifth embodiment, the information processing device 100 can change the style of a character string acquired by performing character recognition processing. As a result, the convenience for the user is improved.

The processing section 33 according to the fifth embodiment may include the counting section 331, the determining section 332, the first performing section 333, and the second performing section 334 likewise to the processing section 33 according to the second embodiment.

Sixth Embodiment

Figure 13:
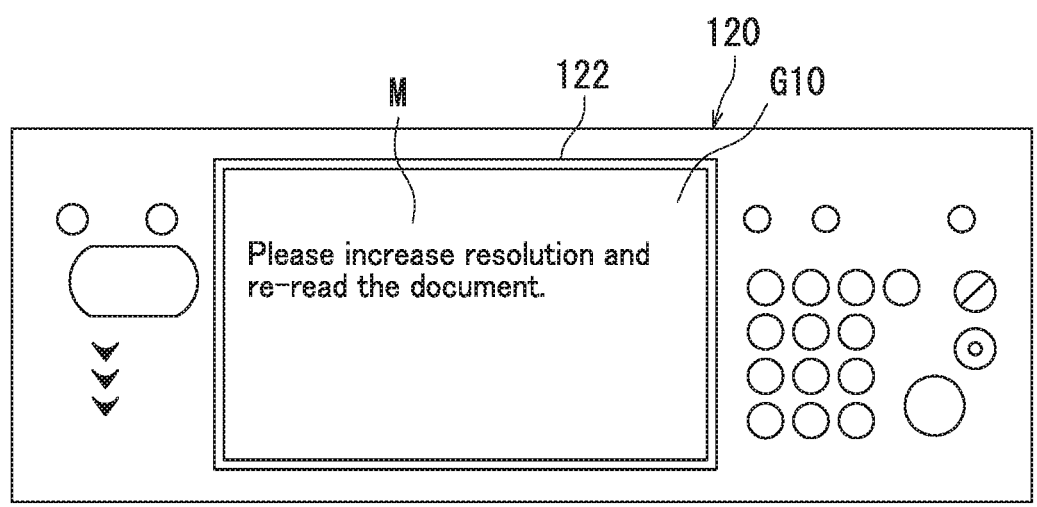
FIG. 13 is a diagram illustrating an instruction screen according to a sixth embodiment of the present disclosure.

The following describes a sixth embodiment of the present disclosure with reference to FIGS. 1, 4, and 13. The processing section 33 of the sixth embodiment displays re-reading instruction information M on the display section 122 described with reference to FIG. 1 when the character density of a character image included in a first image of the document image G1 is equal to or greater than a preset value.

Character density indicates a ratio of the number of pixels forming a character to the number of pixels forming a character image. The preset value is 60%, for example. The re-reading instruction information M is information instructing reading of a document image. The image reading section 10 then reads the document image at a resolution higher than the resolution set when the document image was previously read.

A character image with a high character density is an image including kanji with several strokes, for example. Character recognition accuracy is low for a character image with a high character density. When a first image includes a character image with a high character density, the information processing device 100 instructs the user to have the document D re-read with the image reading section 10 at a higher resolution. When the user follows the instruction, the character recognition accuracy increases.

Specifically, when the first image includes a character image with a high character density, the processing section 33 controls the display section 122 such that the display section 122 displays an instruction screen G10.

FIG. 13 is a diagram illustrating the instruction screen G10. The instruction screen G010 displays the re-reading instruction information M. The re-reading instruction information M exhibits the following: "Please increase resolution and re-read the document". The user follows the re-reading instruction information M and changes the resolution from 200 dots per inch (dpi) to 400 dpi, for example, thereby increasing character recognition accuracy.

The configuration of the information processing device 100 of the sixth embodiment is the same as the configuration of the information processing device 100 of the first embodiment except for that the processing section 33 controls the display section 122 to display the re-reading instruction information M. Accordingly, description of the configuration of the information processing device 100 of the sixth embodiment is omitted.

The operation of the information processing device 100 of the sixth embodiment is the same operation as the information processing device 100 of the first embodiment except for that the processing section 33 controls the display section 122 to display the re-reading instruction information M. Accordingly, description of the operation of the information processing device 100 of the sixth embodiment is omitted.

The information processing device 100 according to the sixth embodiment of the present disclosure is described above with reference to FIGS. 1, 4, and 13. According to the sixth embodiment, the information processing device 100 instructs the user to have the document D re-read at a higher resolution when a character with a high character density is included in a first image. When the user instructs re-reading at a higher resolution, character recognition accuracy increases. As a result, the convenience for the user improves.

Note that the processing section 33 according to the sixth embodiment may include the counting section 331, the determining section 332, the first performing section 333, and the second performing section 334 likewise to the processing section 33 according to the second embodiment.

The present embodiments are described above with reference to the accompanying drawings. However, the present disclosure is not limited to the above embodiments, and may be implemented in various manners within a scope not departing from the gist of the present disclosure (as described below in (1) and (2), for example). The drawings illustrate main constituent elements schematically to facilitate understanding. Aspects of the elements of configuration illustrated in the drawings, such as number thereof, may differ in practice for the sake of convenience of drawing preparation. Aspects of the constituent elements described in the above embodiments, such as shape thereof, are one example and are not particularly limited. The aspects of the constituent elements described in the above embodiments, such as shape thereof, may be variously altered within a scope not substantially departing from the configuration of the present disclosure.

(1) The embodiments of the present disclosure are described using a multifunction peripheral as an example of the information processing device 100. However, the information processing device 100 of the present disclosure is not limited to a multifunction peripheral. For example, the information processing device 100 may be a smartphone or a tablet terminal. In a case where the information processing device 100 is a smartphone or a tablet terminal, the user selects a first image by dragging over a specific part of an image displayed on a touch panel, for example.

(2) In the embodiments of the present disclosure, each first image includes one identification image, but the first image may include a plurality of differing identification images. In this case, processing content for the information processing device 100 can also be changed according to different identification images. For example, the information processing device 100 may translate a first image in which the identification image is a red marking image and output the translated first image. The information processing device 100 may increase the font size of a first image in which the identification image is a blue marking image and output the first image of which the font size has been increased.

What is claimed is:

1. An information processing device which performs processing on document image data including first image data of a plurality of images which undergoes character recognition processing and second image data which does not undergo the character recognition processing, the information processing device comprising:
   a detecting section configured to detect the first image data from the document image data;
   an extracting section configured to extract the first image data from the document image data;
   a processing section configured to generate composite image data by compositing the images of the first image data and perform the character recognition processing on the composite image data;
   an image reading section configured to read a document image from a document at a preset resolution and generate the document image data; and
   a display section, wherein
   the first image data indicates
      at least one character image, and
      an identification image indicating that the character image is to undergo the character recognition processing,
   the character image exhibits one character,
   the processing section calculates a character density of the character image and performs prescribed processing based on the character density,
   the character density indicates a ratio of a number of pixels forming the character to a number of pixels forming the character image,
   the prescribed processing is processing to control the display section so as to display re-reading instruction information when the character density is equal to or greater than a preset value, and
   the re-reading instruction information is information instructing reading of the document image at a resolution higher than a resolution set when the image reading section previously read the document image.

2. The information processing device according to claim 1, wherein
   the identification image is provided as a plurality of mutually different identification images, and
   each of the images of the first image data exhibits a corresponding one of the identification images.

3. The information processing device according to claim 1, wherein
   the identification image is a marking image superimposed on the character image.

4. The information processing device according to claim 1, wherein
   the identification image includes a symbol or a line drawing specifying an area in which the character image is positioned.

5. The information processing device according to claim 1, wherein
   the processing section changes processing content according to a type of the identification image.

6. The information processing device according to claim 5, wherein
   the processing section translates a character string acquired through the character recognition processing.

7. The information processing device according to claim 5, wherein
   the processing section changes at least one of a color, size, and shape of a character string acquired through the character recognition processing.

8. An information processing method for performing processing on document image data including first image data of a plurality of images that undergoes character recognition processing and second image data that does not undergo the character recognition processing, the information processing method comprising:
   detecting the first image data from the document image data;
   extracting the first image data from the document image data;
   generating composite image data by compositing the images of the first image data;
   performing the character recognition processing on the composite image data;
   reading a document image from a document at a preset resolution and generating the document image data; and
   displaying, wherein
   the first image data indicates
      at least one character image, and
      an identification image indicating that the character image is to undergo the character recognition processing,
   the character image exhibits one character,
   in the performing of the character recognition processing, a character density of the character image is calculated and prescribed processing is performed based on the character density,
   the character density indicates a ratio of a number of pixels forming the character to a number of pixels forming the character image,
   the prescribed processing is processing so as to display re-reading instruction information when the character density is equal to or greater than a preset value, and
   the re-reading instruction information is information instructing reading of the document image at a resolution higher than a resolution set when the document image was previously read.

* * * * *